Nov. 13, 1934.  R. L. WAGNER  1,980,561
WELDED JOINT
Filed Nov. 21, 1929
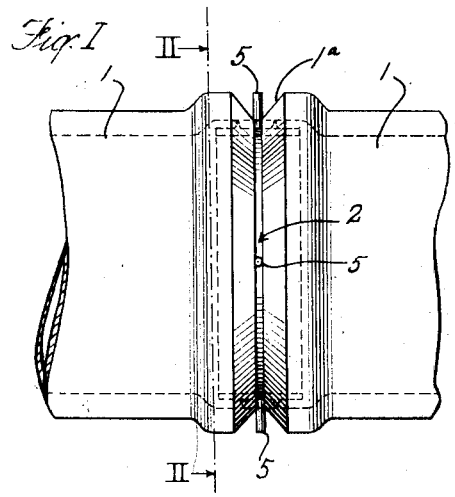
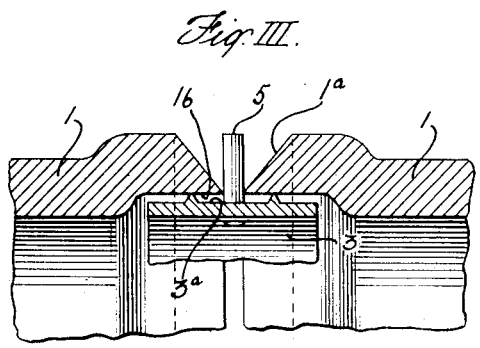
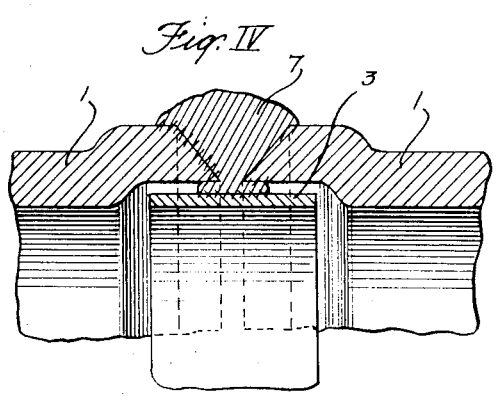
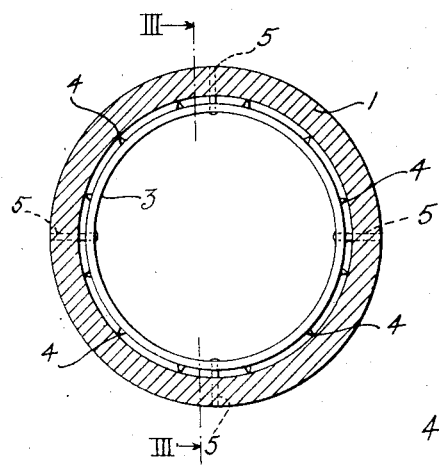
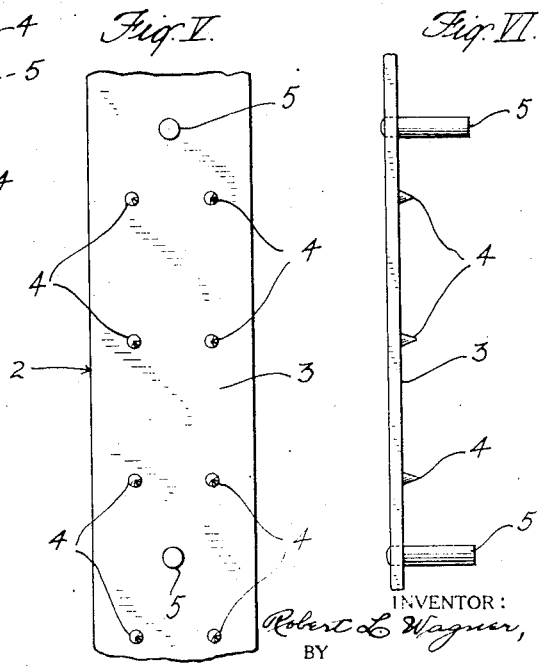
INVENTOR:
Robert L. Wagner,
BY
, ATTORNEYS.

Patented Nov. 13, 1934

1,980,561

UNITED STATES PATENT OFFICE 1,980,561

WELDED JOINT

Robert L. Wagner, Astoria, N. Y., assignor to The Linde Air Products Company, a corporation of Ohio Application November 21, 1929, Serial No. 408,848

13 Claims. (Cl. 113—112)

My invention relates to a fusion welded joint and the method of making same.

The term fusion weld is used herein to denote a weld formed by fusing the metal so that it will run together and unite without the application of pressure, such as hammering or rolling. In some fusion welding operations in order to conveniently position the parts to be joined relatively to each other and to support the fused weld metal in the seam between the parts to be welded, a strip of metal, herein termed a backing-up strip, has been placed underneath the seam so that it overlaps the edges of the metal parts and extends along the seam in close contact with the under surface of the metal parts. Where such strips have been used, they have been so constructed or positioned in reference to the pieces of metal to be welded, that the gases used to fuse the portions of the metal were reflected backwards toward the blowpipe and could not pass through the seam and between the overlapping surfaces of the backing-up strip and the pieces of metal to be joined. Also, practically no weld metal was deposited between these surfaces. As a result, it has been difficult to sufficiently fuse the overlapping surfaces of the backing-up strip and the pieces of metal to be joined to obtain a thorough penetration of the weld at the bottom of the seam and also to obtain a weld that is free from blow holes and oxide formations at this point.

According to my invention, means are provided for spacing the backing-up strip from the inner or under surface of the metal that overlaps the strip, and additional means are provided to allow the welding flame directed into the seam to pass through the seam and between the overlapping portions of the strip and the metal. The passage of the flame through the seam simultaneously fuses the metal at the bottom edge of the seam and the overlapping surfaces of the metal and the backing-up strip adjacent thereto on each side of the seam, and when the fused weld metal is deposited from the rod, it flows between these surfaces and an excellent union substantially free from oxide inclusions and blow holes is obtained at this point and throughout the weld.

One of the objects of my invention is to construct a backing-up strip adapted to maintain the parts to be welded in the proper position while being welded, and to be easily maintained in alignment with the seam to be welded.

Another object of my invention is to provide a means for supporting and retaining the fused metal in the channel between the pieces of metal to be welded.

Another object of my invention is to provide a method and a means for obtaining a thorough penetration of the weld to the inner surface of the parts to be joined, and to eliminate any blow holes and oxide formations at this point.

A joint embodying my invention is described herein and illustrated in the accompanying drawing in which, Fig. I is a side view of the ends of two pipes assembled on the backing-up strip ready to be welded;

Fig. II is a sectional view of Fig. I on line II—II;

Fig. III is a fragmentary sectional view of Fig. II on line III—III;

Fig. IV is a sectional view corresponding to Fig. III but showing the completed pipe joint after the weld metal has been added; and, Figs. V and VI are developed plan and side views, respectively, of the backing-up strip.

My invention may be employed to form a joint along a curved or a straight line. To illustrate my invention, I have shown a joint formed between the ends of two pieces of pipe 1. A backing-up strip 2 is used in the joint to properly position the ends of the pipe 1 in respect to each other and to support the fused metal while the pipe is being welded and to add strength to the finished joint.

The backing-up strip is made of a band of metal 3 having short projections 4 formed on one side of the band. The projections may be formed in any convenient manner such as by punching up portions of the metal from the surface of the band. They are preferably arranged on each side of the center line of the band 3 so they may contact with the inside or under surface of the metal to be welded in order to space the surface of the band 3 from the metal. The strip 2 is provided with a plurality of edge spacing and strip centering metal pins 5 extending from the surface of the band along its center line.

Where the backing-up strip 2 is used in a butt welded pipe joint, or the like, it is provided with three or more edge spacing pins 5, varying in number in accordance with the circumference of the pipe, and it is shaped to fit the inside circumference of the ends of the pipe after the ends have been prepared for welding in the usual manner. In the pipe joint shown herein, the ends of the pipe 1 are belled outwardly to provide a groove to receive the entire strip when the parts are assembled, and the end edges 1a are beveled, but pipes having straight ends and unbeveled edges also may be used.

In assembling the parts of the joint in preparation for welding them together, the band 3 of the circular backing-up strip 2 is inserted in the end of one of the pipes until the edge spacing pins 5 contact with the edge 1a of the pipe. The end of the other pipe to be welded to the first pipe is then slipped over the projecting portion of the backing-up strip until it comes in contact with the opposite side of the edge spacing pins 5. After properly aligning the two pipes 1, the joint is ready to be welded.

It will be noted that the backing-up strip 2 facilitates the assembly of the joint and holds the ends of the pipes 1 in line with each other while they may be welded, and that the edge spacing pins 5 properly space the ends of the pipe 1 and at the same time maintain the strip 2 in alignment with the joint seam. Also, it will be noted that the edge spacing pins 5 in conjunction with the strip spacing projections 4 provide a channel for the circulation of welding gases between the edges 1a of the pipe and the opposed overlapping surfaces of the pipe and the strip.

While my invention is intended for gas flame welding, it may also be used for carbon arc or metal arc welding. When the gas flame is used, a greater heat penetration is obtained between the overlapping surfaces 1b and 3a of the strip and the pieces of metal to be welded, due to the flow of the flame or gases between these surfaces. The bottom edges 1a of the pieces of pipe 1 on each side of the channel therebetween and the adjacent surface of the backing-up strip are fused at the same time which is very desirable in order to effect a complete union of these parts with the weld metal deposited thereon. The gas flame directed between the edges 1a of the pipe 1 also flows between the under surface 1b and the surface 3a of the band 3. The flame acting on these latter surfaces fuses that portion adjacent to the edge 1a and when the weld metal from the welding rod is deposited in the channel between the edges 1a, it flows between the fused overlapping surfaces of the strip 2 and the pipe 1 and forms a weld therebetween as shown in Fig. IV. The outer portion of the seam is filled with weld metal 7 in the usual manner and in so doing, the edge spacing pins 5 are fused and united with the metal deposited in the channel to form a homogeneous weld between the two pieces of pipe.

By spacing the band 3 of the backing-up strip from the under surface 1b of the metal, a better weld penetration is obtained at the bottom of the weld and the tendency to form blow holes and oxide inclusions in the weld is less than when these parts are not spaced. This is due to the fact that the space allows the welding gases to pass freely in contact with the overlapping surfaces of the strip and the metal pieces, and that the bottom edges of the metal pieces and the adjacent surfaces of the backing-up strip are simultaneously fused. Due to this action the deposited weld metal readily unites with these fused parts and any oxides or gas formations that may be present are carried to the outer surface of the weld.

I claim:

1. A backing-up strip for fusion welded joints comprising a band of metal; means cooperating with said band to space portions of said band from the bottom surface of the pieces of metal to be joined; and means cooperating with said band to align said band with the seam between said metal pieces and to provide a non-stop gas passage through said seam between the opposite edges of said metal pieces and through said space between said band and the bottom surface of said metal pieces.

2. A backing-up strip for fusion welded joints, said strip comprising a band of metal; a group of spaced projections extending from the surface of said band on each side of the center line of said band; and a plurality of spaced projections extending from the surface of said band and arranged on a line between said groups of projections.

3. A backing-up strip for fusion welded joints comprising a band of metal; a row of spaced short projections extending from the surface of said band on each side of the center line of said band; and a plurality of longer projections extending from the surface of said band on the center line of said band.

4. An assembly for forming a welded joint; said assembly comprising two pieces of metal having their edges to be joined spaced apart and positioned opposite each other; a band of material underneath said metal pieces and bridging the space between said edges; spaced projections separating said band from the surface of the metal; and spaced projections separating the edges of the pieces of said metal.

5. An assembly for forming a welded joint; said assembly comprising two pieces of metal having their edges to be joined spaced apart and positioned opposite each other; a band of metal underneath said metal and bridging the space between said edges; spaced metal projections attached to said band and separating the band from the surface of said metal pieces; and other spaced metal projections attached to said band, said second projections extending between said metal edges and contacting therewith.

6. An assembly for forming a welded joint; said assembly comprising two pieces of metal having their edges to be joined spaced apart and positioned opposite each other; a band of metal underneath said metal bridging the space between and overlapping said edges; projections spaced along said band and attached thereto on each side of its center line and contacting with said metal pieces to space said band from said work; and a second set of projections spaced along the center line of said band and attached thereto, said second projections extending between said edges to position said band in respect to said edges and to provide communication between said edges to the space between the overlapping portions of said band and said work.

7. An assembly for forming a welded joint; said assembly comprising two cylindrical members having their ends to be joined spaced apart and positioned opposite each other; a circular band within said ends bridging the space therebetween; projections on said band contacting with the inside ends of said members; a row of spaced projections on said band extending between and contacting with the ends of said members.

8. A fusion butt welded joint formed between the ends of two pieces of metal; said ends being off-set from the body of the metal to form a groove; a backing-up strip having a band in said groove and spaced from the surface thereof; and added fusion weld metal filling a portion of said space and uniting said pieces of metal to each other and to the backing-up strip.

9. A method of forming a fusion welded joint between the ends of two cylindrical members comprising inserting a circular backing-up strip in the ends of each member so that the outer surface of the backing-up strip is spaced from the inner surface of said members, and the edges of said members are spaced apart; directing a flame from the opposite side of the joint from said strip so that the flame is directed between the edges of said members and between the overlapping surfaces of the backing-up strip and the members to be welded, thereby fusing the surfaces of said edges and said overlapping surfaces; and depositing fused weld metal between said overlapping and edge surfaces.

10. A method of forming a fusion-welded joint between the edges of two pieces of metal which comprises assembling said edges in opposed and spaced relation; disposing a metal strip opposite one side of the space between said edges and overlapping both of said pieces but contacting with the latter only at intervals; from the other side of said space, applying a welding flame to said edges, to the opposed portions of said pieces and said strip, and into the spaces between such intervals of contact, to heat such edges and opposed portions to a welding temperature; and, during the application of said welding flame, melting additional metal and depositing this molten metal between such heated edges and between such heated opposed portions and into said spaces between said intervals of contact.

11. A method of forming a fusion-welded joint according to claim 10, in which parts of said pieces comprising said edges are offset to provide a groove when said edges are assembled in opposed relation; and said strip is entirely disposed in said groove.

12. A backing-up strip for fusion-welded joints, said strip comprising a band of metal having on one face thereof projections spaced apart lengthwise of said band and consisting of punched-up portions of said band, and a row of projections on said band and extending lengthwise thereof between the first-mentioned projections.

13. An assembly for forming a welded joint, said assembly comprising a pair of metal pipes having belled ends provided with annular edges which are opposed and spaced apart, and an annular band of metal bridging the space between said edges and overlapping interior portions of said ends, said band having a circumferential row of projections engaging said opposed edges and separating them a uniform distance, said band also having circumferentially spaced projections engaging the inner surfaces of said belled ends, the inner diameter of said band being substantially no greater than the inner diameter of the main portions of said pipes.

ROBERT L. WAGNER.